(12) United States Patent
Longhenry et al.

(10) Patent No.: US 10,200,442 B2
(45) Date of Patent: *Feb. 5, 2019

(54) TRACKING MOBILE APP INSTALLATIONS (71) Applicant: Tapjoy, Inc., San Francisco, CA (US)

(72) Inventors: Paul Louis Longhenry, Hillsborough, CA (US); Hai-Van Pham, Milpitas, CA (US); Christopher Paul Farm, San Francisco, CA (US)

(73) Assignee: TAPJOY, INC., San Francisco, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/264,165

(22) Filed: Sep. 13, 2016

(65) Prior Publication Data
US 2016/0379280 A1 Dec. 29, 2016

Related U.S. Application Data (63) Continuation of application No. 13/733,743, filed on Jan. 3, 2013, now Pat. No. 9,477,483.

(51) Int. Cl.
*H04L 29/08* (2006.01)
*H04L 29/06* (2006.01)
(Continued)

(52) U.S. Cl.
CPC ............. *H04L 67/02* (2013.01); *G06F 9/44* (2013.01); *G06Q 30/0239* (2013.01);
(Continued)

(58) Field of Classification Search
CPC ...... G06F 9/44; G06F 9/44526; G06F 9/5061; H04L 67/34; H04L 67/42
See application file for complete search history.

(56) References Cited

U.S. PATENT DOCUMENTS 6,564,261 B1    5/2003  Gudjonsson et al.
6,968,359 B1 * 11/2005  Miller ................... G06F 9/5061
                                                      709/205

(Continued)

OTHER PUBLICATIONS

European Patent Office, "Search Report" in application No. PCT/US2013/078452, dated Mar. 27, 2014, 10 pages.
(Continued)

*Primary Examiner* — Ramy M Osman
(74) *Attorney, Agent, or Firm* — Hickman Palermo Becker Bingham LLP (57) ABSTRACT

In an embodiment, a data processing method comprises receiving, at a mobile computing device, a request comprising a protocol identifier, a label value, and a data value, wherein the protocol identifier is associated with a protocol implemented in a first mobile app; using a protocol handler in the mobile computing device associated with the protocol, initiating processing of the request; using a native code element in the mobile computing device: intercepting the request when the label value matches a particular expression, and in response to the intercepting, providing the data value to other than the first mobile app, the protocol handler or the native code element; wherein the method is performed by one or more computing devices.

22 Claims, 5 Drawing Sheets (51) Int. Cl.
  *G06F 9/44* (2018.01)
  *H04W 4/21* (2018.01)
  *H04W 4/60* (2018.01)
  *G06Q 30/02* (2012.01)
  *G06F 8/61* (2018.01)

(52) U.S. Cl.
  CPC ..... *G06Q 30/0246* (2013.01); *G06Q 30/0277* (2013.01); *H04L 67/34* (2013.01); *H04L 67/42* (2013.01); *H04W 4/21* (2018.02); *H04W 4/60* (2018.02); *G06F 8/61* (2013.01)

(56) References Cited

U.S. PATENT DOCUMENTS

| | | | |
|---|---|---|---|
| 7,010,609 B1 | 3/2006 | Black | |
| 7,647,252 B2 | 1/2010 | Rampell et al. | |
| 7,698,171 B2 | 4/2010 | Rampell et al. | |
| 7,788,139 B2 | 8/2010 | Rampell et al. | |
| 7,848,960 B2 | 12/2010 | Rampell et al. | |
| 9,165,312 B2 | 10/2015 | Longhenry | |
| 9,348,572 B2 | 5/2016 | Farm | |
| 9,477,483 B2 * | 10/2016 | Longhenry | G06F 9/44 |
| 2002/0128057 A1 | 9/2002 | Walker et al. | |
| 2003/0023604 A1 | 1/2003 | O'Brien | |
| 2003/0028447 A1 | 2/2003 | O'Brien | |
| 2003/0084439 A1 | 5/2003 | Perkins | |
| 2003/0177281 A1 | 9/2003 | McQuillan et al. | |
| 2004/0267933 A1 | 12/2004 | Przybylski | |
| 2005/0114469 A1 | 5/2005 | Nakamura | |
| 2007/0197260 A1 | 8/2007 | Randall | |
| 2008/0077506 A1 | 3/2008 | Rampell et al. | |
| 2008/0091528 A1 | 4/2008 | Rampell et al. | |
| 2008/0162371 A1 | 7/2008 | Rampell et al. | |
| 2009/0095333 A1 | 4/2009 | Lim | |
| 2009/0292599 A1 | 11/2009 | Rampell et al. | |
| 2010/0235373 A1 | 9/2010 | Holden et al. | |
| 2011/0131089 A1 | 6/2011 | Walker et al. | |
| 2012/0035990 A1 | 2/2012 | Lewis et al. | |
| 2012/0102485 A1 | 4/2012 | Goldman | |
| 2012/0197716 A1 | 8/2012 | Rampell et al. | |
| 2012/0197717 A1 | 8/2012 | Rampell et al. | |
| 2012/0197730 A1 | 8/2012 | Rampell et al. | |
| 2012/0197731 A1 | 8/2012 | Rampell et al. | |
| 2012/0209668 A1 | 8/2012 | Angelos et al. | |
| 2012/0209908 A1 | 8/2012 | Angelos et al. | |
| 2012/0265595 A1 | 10/2012 | Corner | |
| 2014/0188980 A1 | 7/2014 | Longhenry et al. | |
| 2014/0282497 A1 | 9/2014 | Farm et al. | |
| 2016/0379280 A1 * | 12/2016 | Longhenry | H04L 67/34 705/14.45 |

OTHER PUBLICATIONS

European Current Claims in application No. PCT/2013/078452, dated Mar. 2014, 6 pages.

U.S. Appl. No. 13/733,743, filed Jan. 3, 2013, Office Action, dated Jul. 14, 2015.

U.S. Appl. No. 13/733,743, filed Jan. 3, 2013, Office Action, dated Feb. 11, 2015.

U.S. Appl. No. 13/733,743, filed Jan. 3, 2013, Office Action, dated Jan. 11, 2016.

U.S. Appl. No. 13/733,743, filed Jan. 3, 2013, Notice of Allowance, dated Jun. 14, 2016.

* cited by examiner

TRACKING MOBILE APP INSTALLATIONS

BENEFIT CLAIM

This application claims the benefit as a Continuation of application Ser. No. 13/733,743, filed Jan. 3, 2013, the entire contents of which are hereby incorporated by reference for all purposes as if fully set forth herein. The applicant(s) hereby rescind any disclaimer of claim scope in the parent application or the prosecution history thereof and advise the USPTO that the claims in this application may be broader than any claim in the parent application.

FIELD OF THE DISCLOSURE

The present disclosure generally relates to data processing techniques for connecting data associated with mobile web browser activities and data associated with native mobile device application activities.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Tracking the activities of users that download and engage with computer program applications ("apps") for mobile computing devices is an important goal of such app vendors. One approach used to track such activities is to obtain unique device identifiers for the end users' mobile computing devices. The unique device identifiers in the context of APPLE IPHONE devices running APPLE's iOS operating system take a variety of forms, including UDID, MAC Address, advertisingIdentifier, Vendor ID, and other equivalent values or fields that are sufficiently unique to identify individual devices (collectively, "UIDs"). In current practice, server computers that are in contact with Apple iOS based apps are able to request and obtain any of these UID values from mobile computing devices, however, only the UDID is accessible by mobile browsers on Apple iOS based devices. Therefore, on Apple iOS devices, the ability to associate app-based activities with browser-based activities for individual users is hindered whenever app-based activities do not have access to the UDID of a given device.

A protocol handler provides communication services allowing one computing device to send data to other devices under specific communication rules specified by the protocol. Simple Mail Transfer Protocol (SMTP) and File Transfer Protocol (FTP) are examples of protocols that may be associated with protocol handlers, which interpret messages or requests that conform to those protocols. Protocol handlers have been used for the purpose of launching apps on mobile computing devices or other devices. For example, it has been possible for a first app to invoke a function of a second app by using an inter-app messaging facility to send a request, formatted according to the second app's protocol. However, these mechanisms are not always practical in particular contexts.

SUMMARY

The appended claims may serve as a summary of the invention.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In an embodiment, a data processing method comprises receiving, at a mobile computing device, a request comprising a protocol identifier, a label value, and a data value, wherein the protocol identifier is associated with a protocol implemented in a first mobile app; using a protocol handler in the mobile computing device associated with the protocol, initiating processing of the request; using a native code element in the mobile computing device: intercepting the request when the label value matches a particular expression, and in response to the intercepting, providing the data value to other than the first mobile app, the protocol handler or the native code element; wherein the method is performed by one or more computing devices.

In another embodiment, a data processing method comprises causing a first app, linked with the native code element as part of a software development kit (SDK), to be installed and registered on a mobile computing device; accessing a web page associated with a service provider, wherein the web page contains a link comprising a first protocol identifier, a label value, and a data value, wherein the first protocol identifier is associated with a protocol implemented in a first mobile app; receiving a request based on the link that includes the first protocol identifier, the label value, and the data value; matching the first protocol identifier to using a protocol handler in the mobile computing device associated with the protocol; using a native code element in the mobile computing device: intercepting the request when the label value matches a particular expression and processing the request on behalf of the protocol handler; obtaining a UID from the mobile computing device; providing the UID to any of: a server computer via a callback that includes the UID and the data; or a second app; wherein the method is performed by one or more special-purpose computing devices.

In another embodiment, a data processing method comprises determining that a mobile computing device does not have a protocol handler-enabled app installed on the mobile computing device; causing or instructing the mobile computing device to install one or more protocol handler-enabled apps, linked with the native code element as part of a software development kit (SDK), on the mobile computing device; storing data identifying a particular protocol handler-enabled app; receiving a request to access a web page associated with a service provider, wherein the web page contains a link comprising a first protocol identifier, a label value, and a data value, wherein the first protocol identifier is associated with a protocol implemented in the particular protocol handler-enabled app; receiving a request based on the link that includes the first protocol identifier, the label value, and the data value; matching the first protocol identifier to using a protocol handler in the mobile computing device associated with the protocol; using a native code element in the mobile computing device: intercepting the request when the label value matches a particular expression and processing the request on behalf of the protocol handler; obtaining a UID from the mobile computing device; providing the UID to any of: a server computer via a callback that includes the UID and the data; or a second app; wherein the method is performed by one or more special-purpose computing devices.

In an embodiment, a data processing method comprises receiving, at a mobile computing device, a request comprising a protocol identifier, a label value, and a data value, wherein the protocol identifier is associated with a protocol implemented in a first mobile app; using a protocol handler in the mobile computing device associated with the protocol, initiating processing of the request; using a native code element in the mobile computing device: intercepting the request when the label value matches a particular expression, and in response to the intercepting, providing the data value to other than the first mobile app, the protocol handler or the native code element; wherein the method is performed by one or more computing devices.

In another embodiment, a data processing method comprises causing a first app, linked with the native code element as part of a software development kit (SDK), to be installed and registered on a mobile computing device; accessing a web page associated with a service provider, wherein the web page contains a link comprising a first protocol identifier, a label value, and a data value, wherein the first protocol identifier is associated with a protocol implemented in a first mobile app; receiving a request based on the link that includes the first protocol identifier, the label value, and the data value; matching the first protocol identifier to using a protocol handler in the mobile computing device associated with the protocol; using a native code element in the mobile computing device: intercepting the request when the label value matches a particular expression and processing the request on behalf of the protocol handler; obtaining a UID from the mobile computing device; providing the UID to any of: a server computer via a callback that includes the UID and the data; or a second app; wherein the method is performed by one or more special-purpose computing devices.

In yet another embodiment, a data processing method comprises determining that a mobile computing device does not have a protocol handler-enabled app installed on the mobile computing device; causing or instructing the mobile computing device to install one or more protocol handler-enabled apps, linked with the native code element as part of a software development kit (SDK), on the mobile computing device; storing data identifying a particular protocol handler-enabled app; receiving a request to access a web page associated with a service provider, wherein the web page contains a link comprising a first protocol identifier, a label value, and a data value, wherein the first protocol identifier is associated with a protocol implemented in the particular protocol handler-enabled app; receiving a request based on the link that includes the first protocol identifier, the label value, and the data value; matching the first protocol identifier to using a protocol handler in the mobile computing device associated with the protocol; using a native code element in the mobile computing device: intercepting the request when the label value matches a particular expression and processing the request on behalf of the protocol handler; obtaining a UID from the mobile computing device; providing the UID to any of: a server computer via a callback that includes the UID and the data; or a second app; wherein the method is performed by one or more special-purpose computing devices.

2. Structural & Functional Overview

Figure 1:
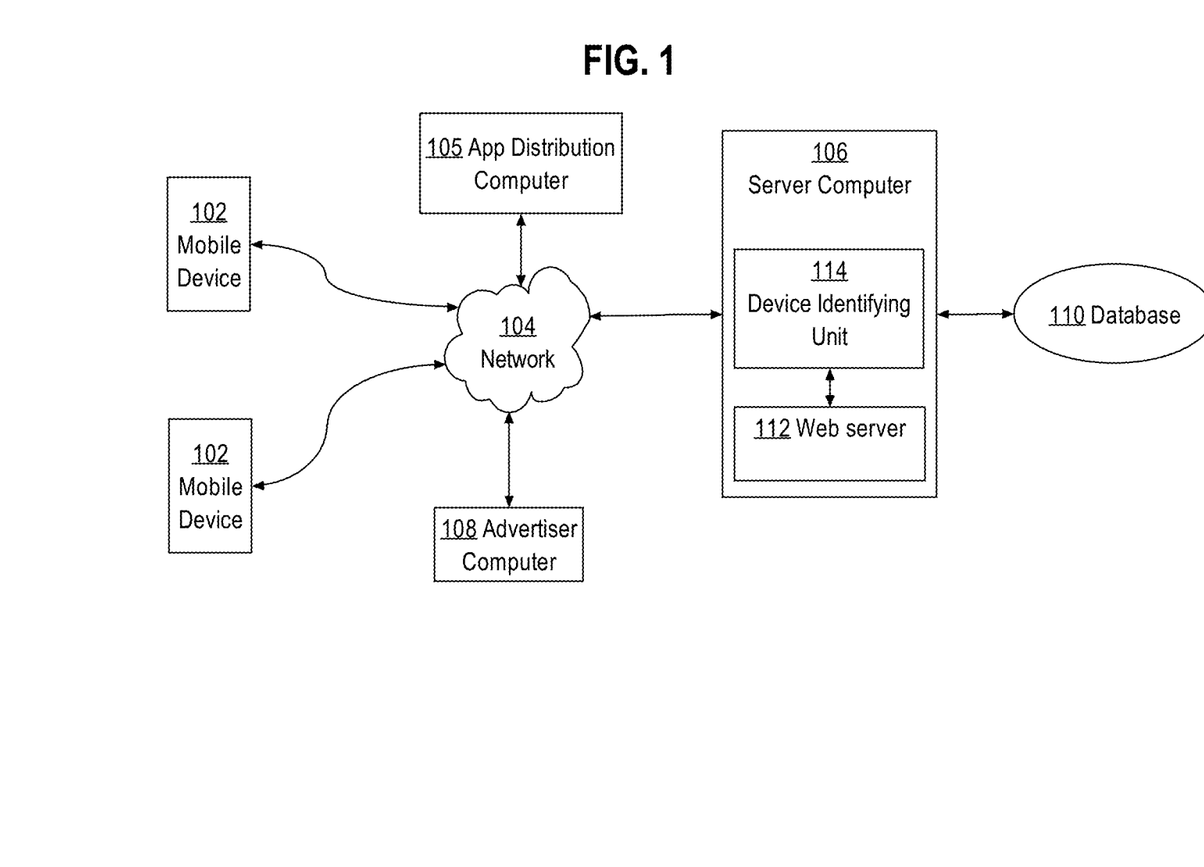
FIG. 1 illustrates a networked computer system arrangement that may be used to implement an embodiment.

FIG. 1 illustrates a networked computer system arrangement that may be used to implement an embodiment. In an embodiment, the computer system generally comprises one or more mobile computing devices 102, a network 104, at least one server computer 106 coupled to a database 110, one or more app distribution computers 105 and one or more advertiser computers 108.

Each of the mobile computing devices 102 comprises a smartphone, tablet computer, netbook computer, laptop computer, or other movable computer. Examples include APPLE IPHONE and IPAD devices, ANDROID devices, etc. Typically wireless links couple the mobile devices 102 to network 104, which broadly represents one or more local area networks, wide area networks, internetworks, global interconnected internetworks such as the public internet, or a combination thereof. For purposes of illustrating a clear example, two (2) mobile devices 102 are shown in FIG. 1 and one cloud symbol representing network 104 is shown, but practical implementations may use thousands or millions of mobile devices and any number of interconnected networks.

App distribution computer 105 is associated with a developer, author or publisher of a mobile device application computer program or app, or a distribution channel such as a centralized app downloading service; examples include the APPLE APP STORE and GOOGLE PLAY service. The app may be a game app, utility app, product-related app, or other app. Typically the app developer, author or publisher desires to provide advertising within the graphical user interface displays of the app, or is willing to enable certain functions, options or features in the app in exchange for display of advertising within the app. Typically the app developer, author or publisher does not have direct contract or compensation relationships with advertisers but relies on server computer 106, and/or an advertising network or advertising service with which it generally does have a contractual relationship with which is supported by the server computer, to provide advertisements on the apps. The advertiser computer 108 may serve ads to apps installed on mobile devices 102 directly or the server computer 106 may serve the ads.

Server computer 106 may be owned and operated by an app vendor, advertising network operator, or other party other than users who own or operate the mobile devices 102. In an embodiment, server computer 106 hosts at least a web server 112 and a device identifying unit 114, which is configured to perform the processes herein associated with obtaining device identifying information from the mobile devices 102.

In one particular embodiment, server computer 106 is associated with an advertising network service that directs advertisements to apps that comply with an application programming interface (API) or software development kit (SDK) defined by the advertising network service operator. In a commercial embodiment, the operator is Tapjoy, Inc., San Francisco, Calif. Advertisers associated with computer such as advertiser computer 108 place advertisements with the service provider. Publishers, such as software developers, game developers, or vendors of products or services, cause authoring and publication of apps that may provide non-advertising functions, such as games. The apps implement the API or SDK defined by the service provider. The service provider routes advertisements from advertiser computer 108, or other sources, to the apps via the API or SDK. Compensation flows between the advertiser, service provider, and publishers according to known advertising compensation models. Users of mobile devices 102 benefit from use of the apps and exposure to products or services that may interest them. They also interact with ads served from Network 104.

Server computer 106 may be coupled to a database 110 that is configured to store data obtained from the mobile devices 102.

Figure 2:
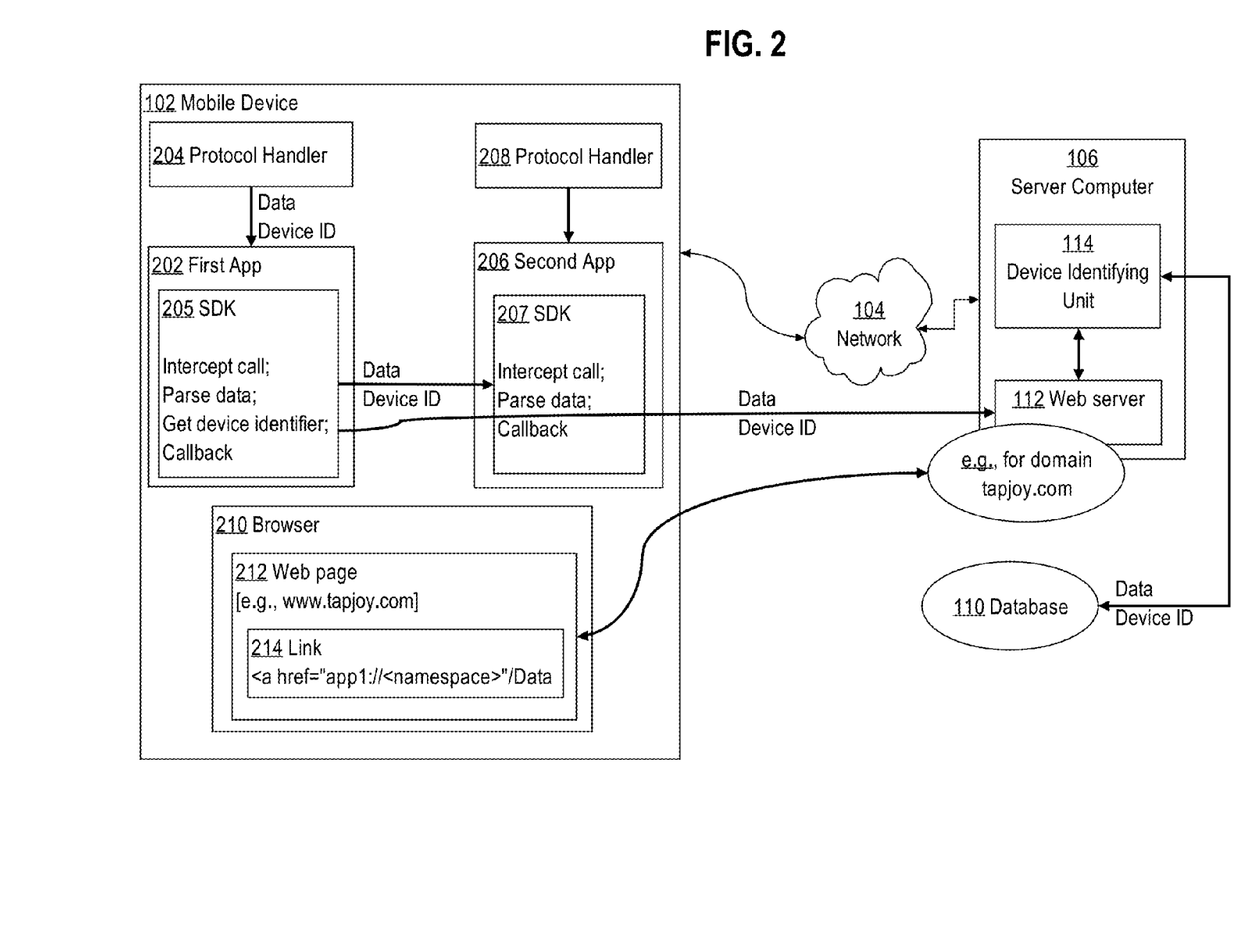
FIG. 2 illustrates further details of an embodiment of the system of FIG. 1.

FIG. 2 illustrates further details of an embodiment of the system of FIG. 1. In an embodiment, one of the mobile devices 102 hosts, executes or otherwise comprises a first app 202, second app 206, and mobile web browser 210. First app 202 registers a protocol handler 204 with the mobile operating system. The registered protocol handler 204 is configured to respond to messages or requests that are tagged with a protocol identifier prefix that uniquely identifies the first app 202 or its registered protocol handler 204. The first app 202 also comprises SDK code 205 that is configured to perform special processing, further described herein, when messages or requests in the protocol also include a label or namespace value that signifies a request for special processing. Second app 206 has a registered second protocol handler 208 that is configured to respond to messages or requests that are tagged with a protocol identifier that uniquely identifies the second app or its protocol handler 208. Second app 206 further comprises SDK code 207 that is configured to perform special processing for requests in the second protocol that include the label or namespace value that signifies special processing, as further described.

For purposes of illustrating a clear example, FIG. 2 shows two apps 202, 206, protocol handlers 204, 208, and instances of SDK code 205, 207, but other embodiments may include any number of apps based upon the amount of memory or other storage that is available in the mobile device 102. For purposes of illustrating a clear embodiment, FIG. 2 does not show distribution platforms that may be used to assign the protocol handlers to the OS installations.

SDK code 205, 207 typically is statically linked or dynamically linked to the rest of the code of the first app 202 and second app 206, respectively, at the time that a developer prepares production versions of executables of the first app and second app. Consequently, at runtime, the SDK code 205, 207 runs as native code in the mobile device 102. However, the source code for SDK code 205, 207 typically is defined by the owner or operator of the server computer 106 and is not always known to the app developer, author or publisher, except possibly with respect to public interfaces or APIs that the owner or operator of the server computer elects to publish or disclose.

Browser 210 may comprise a program, application, or script configured to send and receive HTTP requests and responses and to render HTML documents in a display unit of the mobile computing device 102. For example, browser 210 may request a web page 212, such as a home page or other page of the domain www.tapjoy.com, commercially available from Tapjoy, Inc., San Francisco, Calif., which may contain one or more links 214, which are configured and used as further described herein.

In the embodiment of FIG. 2, server computer 106 comprises a web server 112 that is configured in the server computers of the public Domain Name System (DNS) as responsive to HTTP requests that include the domain name tapjoy.com, or the equivalent. Web server 112 may operate under the control or direction of a device identifying unit 114, which may comprise logic or program code that is configured to perform the server-side operations that are further described herein with respect to FIG. 3A. In particular, device identifying unit 114 is configured to generate web page 212 as described below and to generate one or more links 214, dynamically if necessary, as further described herein for FIG. 3A.

Figure 3A:
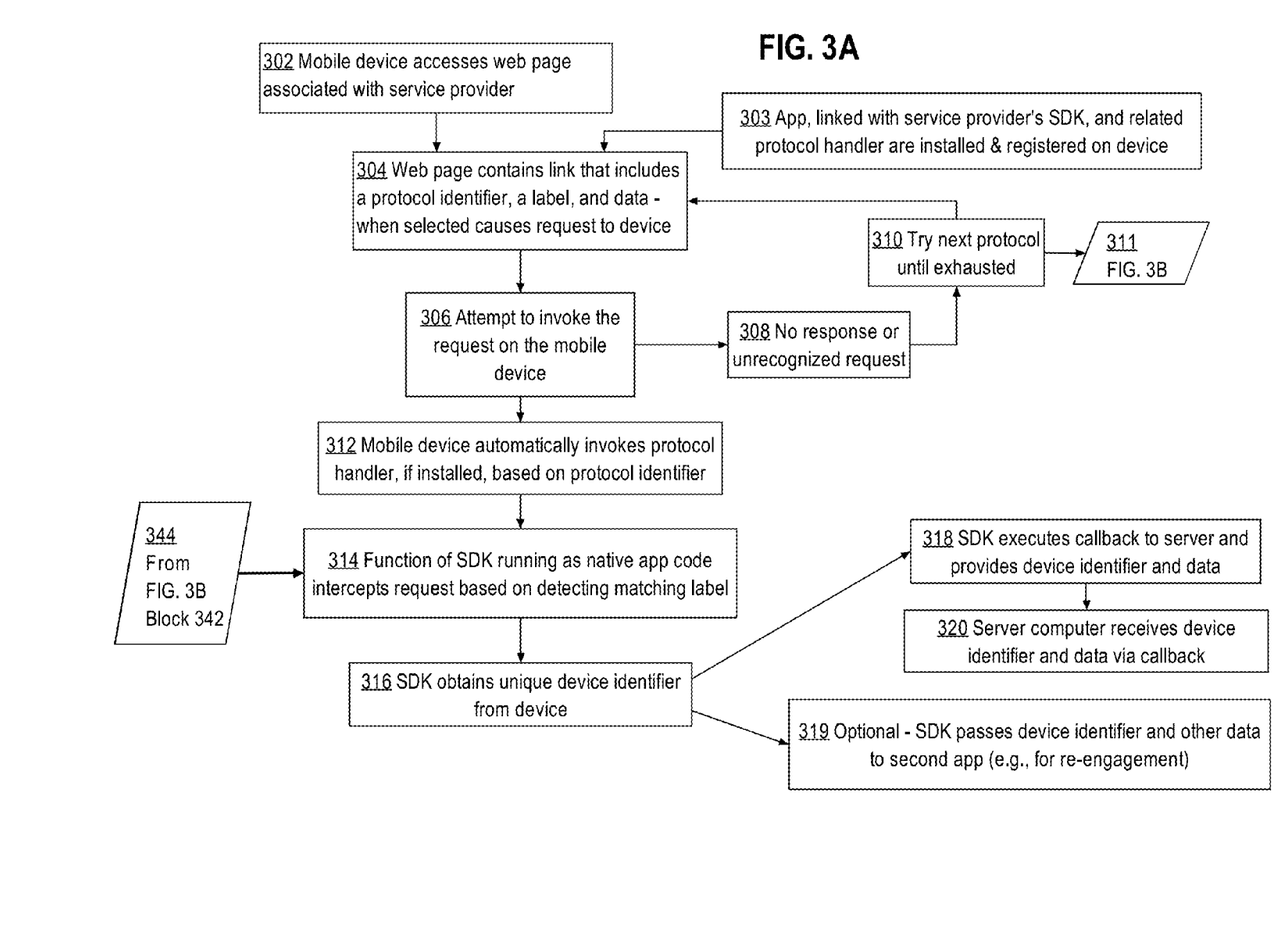
FIG. 3A illustrates a computer-implemented process that may be used to implement an embodiment.
Figure 3B:
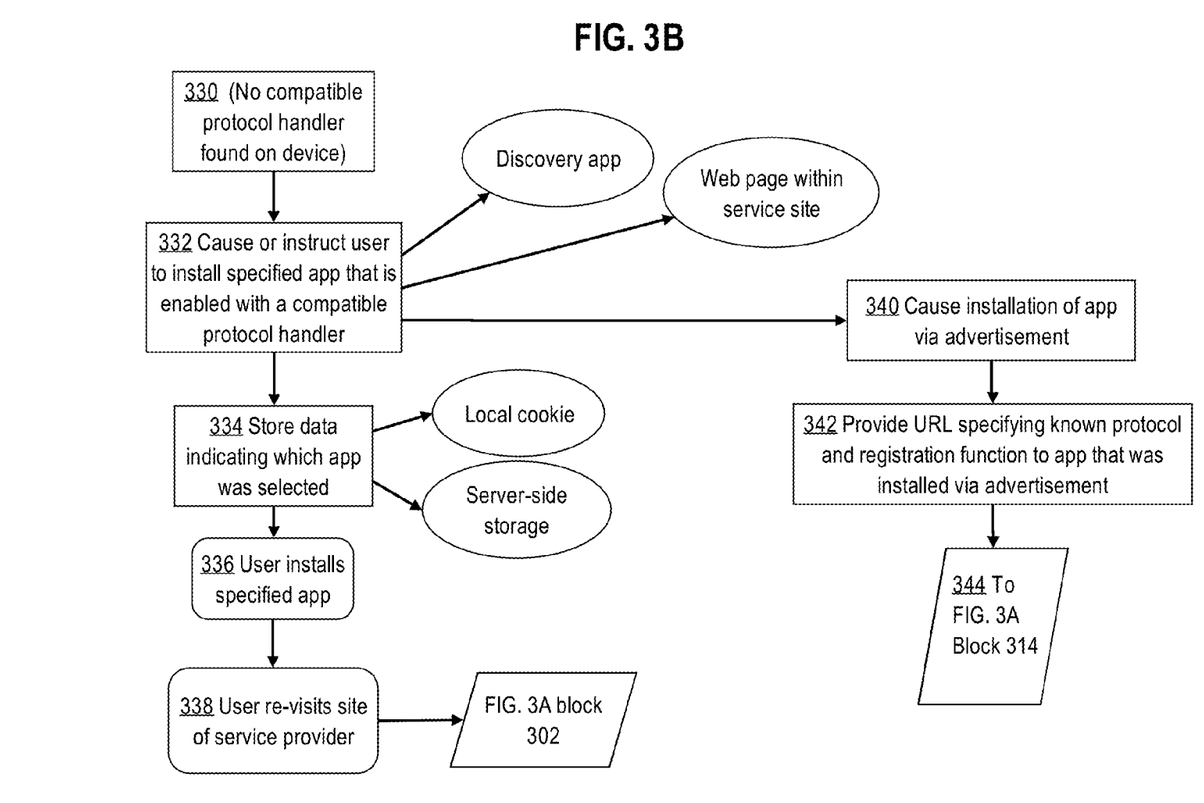
FIG. 3B illustrates another embodiment of a computer-implemented process that may be used to implement an embodiment.

FIG. 3A, FIG. 3B illustrate embodiments of a computer-implemented process that may be used to implement an embodiment. For purposes of illustrating a clear example, the process of FIG. 3A, FIG. 3B is described herein with reference to the system of FIG. 1, FIG. 2, but other embodiments may be used in connection with different computer arrangements that yield equivalent or similar functional results.

Referring first to FIG. 3A, at block 302, a mobile device accesses a web page associated with a service provider. For example, mobile device 102 of FIG. 1, FIG. 2 accesses the web server 112 of the server computer 106. In one particular example, an IPHONE device user might use the SAFARI browser built into the IPHONE device to access the website www.tapjoy.com. Typically the mobile device 102 accesses the web page associated with the service provider for purposes of confirming an app that the mobile device previously downloaded.

Block 303 indicates that at least one mobile app, which has been linked with the service provider's SDK, and has a protocol handler, has been installed on the device. For example, at any time prior to execution of block 304 and subsequent functional blocks, a user of the mobile device selects, downloads and installs a mobile app that has been linked with the service provider's SDK by the app publisher, and that includes a related protocol handler.

In an embodiment, the protocol handler associated with the mobile app is configured to use or respond to messages, requests or calls that identify a particular protocol associated with the mobile app, and the SDK is configured to process certain kinds of requests that carry a particular label or namespace value that has been defined by the service provider, owner or operator of server computer 106. For example, at the time of compiling an executable production version of the app, the app publisher authors and/or registers a protocol handler for the app's protocol, and also statically or dynamically links the app with executable code representing the API or SDK, so that the resulting app executable is integrated with executable code for functions of the API or SDK.

For purposes of illustrating a clear example, the following description refers to performing certain functions using an SDK that is integrated with the protocol handler and/or app. However, other embodiments may use native code in the app that implements an API, or other native code, to achieve functionally equivalent operations and the use of an SDK linked to the app is not always required.

The protocol handler comprises a program, set of routines, or other program code that can respond to requests that carry protocol identifiers associated with that particular handler. In an embodiment, the owner or operator of server computer 106, or the services it provides, requests or requires publishers of apps to use or register a protocol handler that is designated within their app before the publishers are able to use services, such as an advertising network, that are offered through the server computer. Typically the app publisher provides a copy of the designated app or protocol handler to the owner or operator of the server computer 106 for reference, validation or other purposes. Consequently, the server computer 106 is aware of the identity of all apps and their protocol handlers that are configured to use services of the service provider that owns or operates the server computer, and can seek to address the app as needed.

An example of a protocol identifier, for a protocol handler associated with a mobile app named App1, is "app1://". Other examples are described in other sections of this document. At the time of installation, the protocol handler registers with the operating system of the mobile device using registration function calls that are defined by the operating system. Through registration, the operating system creates a record of the existence of the protocol handler and the protocol identifier with which it is associated. Thereafter, when an inbound request arrives that specifies a particular protocol identifier, the operating system is capable of passing the request to a protocol handler that matches the specified protocol identifier.

As indicated in block 304, the web page that was accessed at block 302 contains a request link that includes a particular protocol identifier, a label, and data. In an embodiment, a user of the mobile device invokes the request link by selecting a function, button or other GUI widget associated with completing a designated process. For example, the user may have directed the browser 210 to contact a web page 212 hosted by the server computer 106 that guides the user through a process of registering with a service provided by the server computer. The registration process might involve collecting, among other things, a username and/or email address for purposes of identifying the holder of an account or the user of a device. At the conclusion of the registration process, the web page 212 might contain a prompt such as, "To complete registration, click here to continue." In response to selecting the prompt, the link 214 is invoked.

The data in link 214 may be any data that is necessary for performance of any of the other functions that have been previously described. For example, the data may comprise a click key value that indicates a location within the web page, a function that the user invoked by making a selection, or other information about what the user was doing or attempting to do. Additionally or alternatively, the data may represent any other available information about the device or the user such as user e-mail address or username, or other values. The data need not identify the device; for example, the data could be an advertiser identifier. In an embodiment, links or requests are communicated from the mobile device to the server computer 106 using a protocol that is stateless in the manner that HTTP is stateless, and consequently the data value carried in a request may be highly useful in communicating what function or action the user or device was seeking to perform. Data values used for this purpose may be arbitrary in content, provided that each particular data value that is used in an implementation is recognizable by the server computer 106 as indicating a particular operation, action or function.

The label may be any signaling value, within a namespace recognizable at server computer 106, which enables the protocol handler to recognize that the server computer is attempting to perform a specific operation or related communication with the mobile device. Examples are described in other sections herein.

The protocol identifier is recognizable to the protocol handler that was designated at block 303, or is among a plurality of possible protocol handlers that could have been designated. In an embodiment, the web page 212 contains a plurality of links 214, each of which identifies a different possible protocol handler that could be present on the mobile device. The web page 212 may be structured using client-side browser-executable script code, or the server computer 106 may have server-side code, which is configured to iteratively generate a series of different links 214 or requests, each of which identifies a different protocol handler, for the purpose of iteratively testing whether that particular protocol handler is supported on the device—in which case the app that registered such protocol handler is still installed on the device.

This approach is used because, while the server computer 106 and web page 212 hosted at the server computer cannot be configured in advance with data indicating which protocols are supported on any arbitrary mobile device, the server computer can receive prior notification from app publisher computers 105 about which protocols they have defined for apps that will use services of the server computer, and therefore the server computer can test whether or not each unique protocol handler is resident on a particular mobile device. Operators of advertiser computer 108 also can register protocols and their apps can issue callbacks with data. Therefore, upon receiving communications from an arbitrary mobile device 102 over an open network 104 such as the internet, the server computer 106 is configured to provide a web page 212 that is capable of generating a succession of links 214, each identifying a different possible protocol handler previously registered with the mobile device by an app publisher, until the mobile device is able to invoke a corresponding installed and designated protocol handler. Any number of links may be created and used and in a practical embodiment dozens of apps and protocols might need to be tested.

Blocks 306, 308, 310, 312, 304 represent a loop that corresponds to the iterative protocol testing process outlined above. In an embodiment, at block 306, the web page configured as seen at block 304 issues a request by providing a link that is formatted according to a particular protocol. In an embodiment, requests or links have the format of a uniform resource identifier (URI). An example link is: app1://tapjoy_register/100423b44cd3387a33 where "app1" is a protocol identifier, "tapjoy_register" is a label or signaling string or namespace, and "100423b44cd3387a33" is a data value that is useful in performing some kind of server side operation. In different embodiments, the data value may comprise any information that is available or obtainable during operation of the mobile browser on the mobile device, such as an indication of a location in the web page that the user selected or clicked.

In response to block 306, if the mobile device had installed an app known as "app1" and had designated a corresponding protocol handler for the "app1" protocol at block 303, then at block 312 the mobile device automatically invokes the protocol handler based on matching the protocol identifier in the request that identifies installed, designated protocol handlers. However, if the protocol handler for "app1" is not installed on the mobile device, then at block 308 the web page or server computer will receive no response. Control transfers to block 310 in which a new request is issued to attempt invocation of a different protocol. For example, the next request might have the form "app2://tapjoy_register/100423b44cd3387a33", in which "app2" identifies a different app and related protocol that also has been prepared using the SDK or API defined by the owner or operator of server computer 106.

Blocks 304, 306, 308, 310, 312 are iteratively performed in the foregoing manner until a match occurs and a protocol handler can be invoked at block 312, or until all protocols defined by the server computer 106 have been attempted. If all protocols for apps designated at the server computer 106 have been attempted, and none responds, then as seen at block 311, control transfers to the process of FIG. 3B, which is further described below.

Using this process, when the same mobile computing device contacts the service provider again, the mobile computing device can be recognized as associated with a particular user account, and the subsequent experience provided with the service provider's service can be customized for that user. For example, an app on a smartphone that is enabled with a protocol handler known to a particular service provider can enable the service provider to identify the smartphone as associated with an account holder, and attributes of the account (or the mere fact that an account holder is using the service) can be used to provide a relevant experience.

Invocation of the protocol handler for a designated protocol may occur, at the mobile device, automatically or in response to user action. For example, for security purposes, privacy purposes or to support a reasonable user experience, the mobile device or app may be configured, at block 312, to prompt the user to open an app that matches a designated protocol. In other embodiments, prompts are not required and invocation may occur in response to launching the app.

At block 314, a function of the SDK, running as native app code, intercepts the link 214 by matching the label or, optionally, a value in a particular namespace, which is "tapjoy_register" in the examples above. In other words, while the apps denoted app1 or app2 may implement a protocol handler that matches "app1" or "app2" and permits many kinds of links or requests, when a particular label or signal value is present in a link or request, a function of the SDK interrupts normal protocol handler processing and invokes a processing routine or branches to particular configured program code based on the label for the purpose of confirming any data value, such as a UID, as further described herein. In effect the SDK provides code that implements a special-purpose function for the protocol handler when the request or link contains a specified label value or signaling value. The SDK may also perform the intercepting by matching the label value to a regular expression, rather than matching a single literal value.

At block 316, the SDK function confirms one or more UIDs from the device. In an embodiment, the SDK function calls an operating system call, API function call, or other service on device 102, to confirm one or more UID values. In various embodiments, the unique device identifier value may comprise any other equivalent value or field that is sufficient to confirm or identify the device 102 in a way that is useful for the server computer 106 or the service provider.

As defined in APPLE IOS release 6, and for the purposes of illustrating an example, the advertisingIdentifier is a UID value that the operating system exposes that the user is capable of resetting at any time. The Vendor ID may be a unique device identifier that is determined on a per-vendor basis in association with app or service vendors. For example, the owner or operator of server computer 106 could establish a Vendor ID for a particular mobile device 102 and could consider that value as a unique device identifier, but that value would have no meaning to another vendor of different services or products.

In such an embodiment, the SDK function may invoke an operating system API function call that is available for use by installed code such as native apps, but not capable of invocation by scripts in a browser or other sandboxed code, or not capable of delivery in response to an external request from a server, such as a request from server computer 106 arriving at the mobile device over HTTP via the public internet.

At block 318, the SDK function executes a callback to the server computer and provides the UID value and, optionally, the data value that was received in the request.

In block 320, the server computer receives the UID value or the data value via the callback. At block 320 or in other operations, the server computer may use the UID and/or data as appropriate for a particular server computer application or function, such as supporting a conversion of the mobile device or its user.

FIG. 3B illustrates another embodiment of a computer-implemented process that may be used to implement an embodiment. In an embodiment, as noted above, the process of FIG. 3B is invoked when no protocol handler is found on the mobile device. In such a case, the server computer may be configured to cause the user of the mobile device to download a specified free app and then re-attempt the operation that the user previously attempted to perform. In this approach, the user is essentially asked to download and install an app that is designated at the server computer 106 and has a compatible protocol handler, for the purpose of installing into the mobile device the capability of obtaining the device's advertiser-based identifier via native code and providing it back to the server computer.

In an embodiment, as indicated at block 330 the process of FIG. 3B initiates when no compatible protocol handler has been found on the mobile device using the process of FIG. 3A. At block 332, the process causes or instructs the user to install a specified app that is enabled with a compatible protocol handler. Any of several alternatives may be used to implement block 332. For example, since the process of FIG. 3A began when the user accessed a web site of the service provider using a discovery app or mobile browser on the mobile device, block 332 can comprise redirecting the browser to a specified page that instructs the user to pick and open or download one protocol handler-enabled app from among one or more such apps. Alternatively, a discovery app that the user is currently running may be used to prompt the user to select from among one or more protocol handler-enabled apps. In still another alternative, an advertisement-based mechanism may be used as seen at blocks 340, 342, which are described further below.

At block 334, the process stores data indicating which app was selected, assuming that multiple protocol handler-enabled apps were offered. If the mobile device is then currently running a browser, then one option is that a local cookie may be stored on the device cookie indicating which app was clicked on. Alternatively, the browser or the discovery app may communicate a message back to the service provider's server computer, which can store an identifier of the clicked-on app in association with an account of the mobile device user.

At block 336, the user installs the specified app and in block 338 the user re-visits the site of the service provider. Processing then continues at block 302 of FIG. 3A. Since the server computer interacts with the mobile device using a stateless protocol such as HTTP, each visit at block 302 is processed in generally the same way and the server computer will not have advance knowledge that a particular visit is a re-visit after FIG. 3B. However, upon a re-visit, if the mobile device provides login credentials for an existing account at the server computer, the server computer can inspect its database to determine if a record for the user account contains an identifier of the specified app that was just downloaded. If so, then the server computer can expedite the process of FIG. 3A by issuing a protocol request in only the protocol that is handled by the specified app at block 306, rather than iterating through all supported protocols via the loop of block 304, 306, 308, 310.

In some embodiments, if the user fails to complete the process described in FIG. 3B, then the service provider could provide access to an app recommendation facility, or other limited services, while blocking the mobile device from accessing other services.

Referring now to block 340, in some embodiments an advertisement-based approach may be used in which the process causes installation of a protocol handler-enabled app via an advertisement. As further described, certain using operating system and web server infrastructure may automatically cause app installation and provide useful protocol invocation data. As an example of block 340, a protocol handler-enabled app that should be installed could be provided to the mobile device using the APPLE Smart App Banner (sometimes termed Smart Ads) feature. In this approach, an advertisement is configured on the server computer of the service provider and is delivered typically as a banner advertisement when computer users browse the web site of the service provider. The advertisement references a specified protocol handler-enabled app of the service provider. When a user of a mobile computing device taps on or clicks on the advertisement, the referenced protocol handler-enabled app is automatically downloaded to and installed on the mobile computing device if the mobile computing device does not already have the app installed.

At block 342, the process provides a URL specifying a protocol known to the service provider, and identifying a registration function, to the app that was installed via the advertisement. In an embodiment, the advertisement configuration may specify an "app-argument" value that identifies the service provider's protocol which is recognized by the protocol handler, and specifies a registration or connection function of the app that can cause the app to complete an association of the mobile computing device's UID with an account at the service provider. The "app-argument" value is passed to the app automatically from the advertisement when the associated app opens. If the mobile computing device did not have the app installed at the time the advertisement was clicked on, then the "app-argument" is automatically passed to the device after the app downloads, installs and opens. If the app was already on the device when the advertisement was clicked, then the advertisement automatically changes behavior and causes the app to open, then passes the "app-argument" to the app.

At block 344, control transfers to block 314 of FIG. 3A, and processing continues as described above for block 314 of FIG. 3A and subsequent blocks, under control of the protocol handler-enabled app. In conventional practice, as defined by APPLE, the "app-argument" is a URL that reflects context within a website that contains the ad, or a session ID to download web session state into an app so that the user can have a seamless experience by transitioning to an equivalent or related state in the app. In an embodiment, however, the "app-argument" may specify a protocol recognized by the app and a registration function of the app that causes association of the UID with an account at the service provider's web site. Thus, in this approach the automatic installation of the app with a known protocol, in combination with passing an "app-argument" tagged with the protocol and that specifies what the app should do next to assist in registering the UID to an account of the service provider, can be used to efficiently skip over some of the processing illustrated in FIG. 3A that requires testing for a known protocol handler. Instead, control jumps to block 314 where the registration process can continue without delay.

At that point, processing as described above for block 316, 318, 320, 319 would occur. Thus, this approach has the benefit of rapidly causing installation of a known app on the mobile computing device through an ad click, and the app is instrumented with the equivalent of a protocol handler by having the capability to receive, interpret and use the app-argument to transition to a particular state that can assist in associating a UID with an account at the service provider.

The approach of various embodiments effectively signals the server computer 106 to perform a particular function indicated in the data value, or using the data value, with respect to the UID received in the callback. Either a name of the callback itself, or the data value, may indicate the function to be performed. With the foregoing process, or equivalents, new users of mobile devices 102 that are seeking the use of services at the server computer 106 or a domain that it manages will be able to register with the server computer and reconcile activities that may originate or conclude in 212 with other activities that may conclude or apply to user experiences in 202 or other applications. A UID may be obtained, to fulfill a user request or app request, from the device using internally operating code rather than through direct requests of external code. Further, the UID may be received at the server computer 106 together with other data indicating what operation or request the mobile device or user had attempted. In some embodiments, the data delivered in the callback also may comprise one or more values that are accessible only via native code.

Additionally or alternatively, as seen at block 319, in an embodiment, the UID and other data may be passed from the SDK of the first app 202 to the SDK of the second app 206. In response, the second app 206 may issue a callback to the server computer 106 and provide the UID and other data, or consume the UID and other data locally for other purposes.

One example use of these techniques is re-engagement of users into the second app. For example, the user might have interacted with an ad in the first app 202 resulting in obtaining a reward; through callbacks from the first app to the server computer 106, the server might supply the ad or data about the interaction to the second app 206, and the server then could direct the user into a particular location in the second app, by passing data as described herein, in an attempt to re-engage the user with the second app. Further, the content of the ad in the first app 202 could be configured to help induce engagement with the second app 206.

The device may maintain other unique identifier values for the use of advertisers, vendors of apps, or other parties that are provided by the operating system only for other purposes or to other kinds of apps or systems. Thus, the particular kind of UID value that is obtained is not critical; what is relevant is:

the SDK function executes as part of a native app on the device;

the SDK intercepts a call, identifying a particular protocol, which otherwise would be processed by a protocol handler on the device;

the call was initiated by the server computer attempting to contact an installed app recognizable to the server computer, using a request that is formatted according to a protocol that the installed app defines or is capable of processing, and in response to the mobile device requesting a function or link in a web page that is served by the server computer;

the SDK, as native app code, is capable of obtaining a UID value, and then providing the UID value to the outside system via a callback, along with other data that indicates something about what function or link the mobile device had requested.

3. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
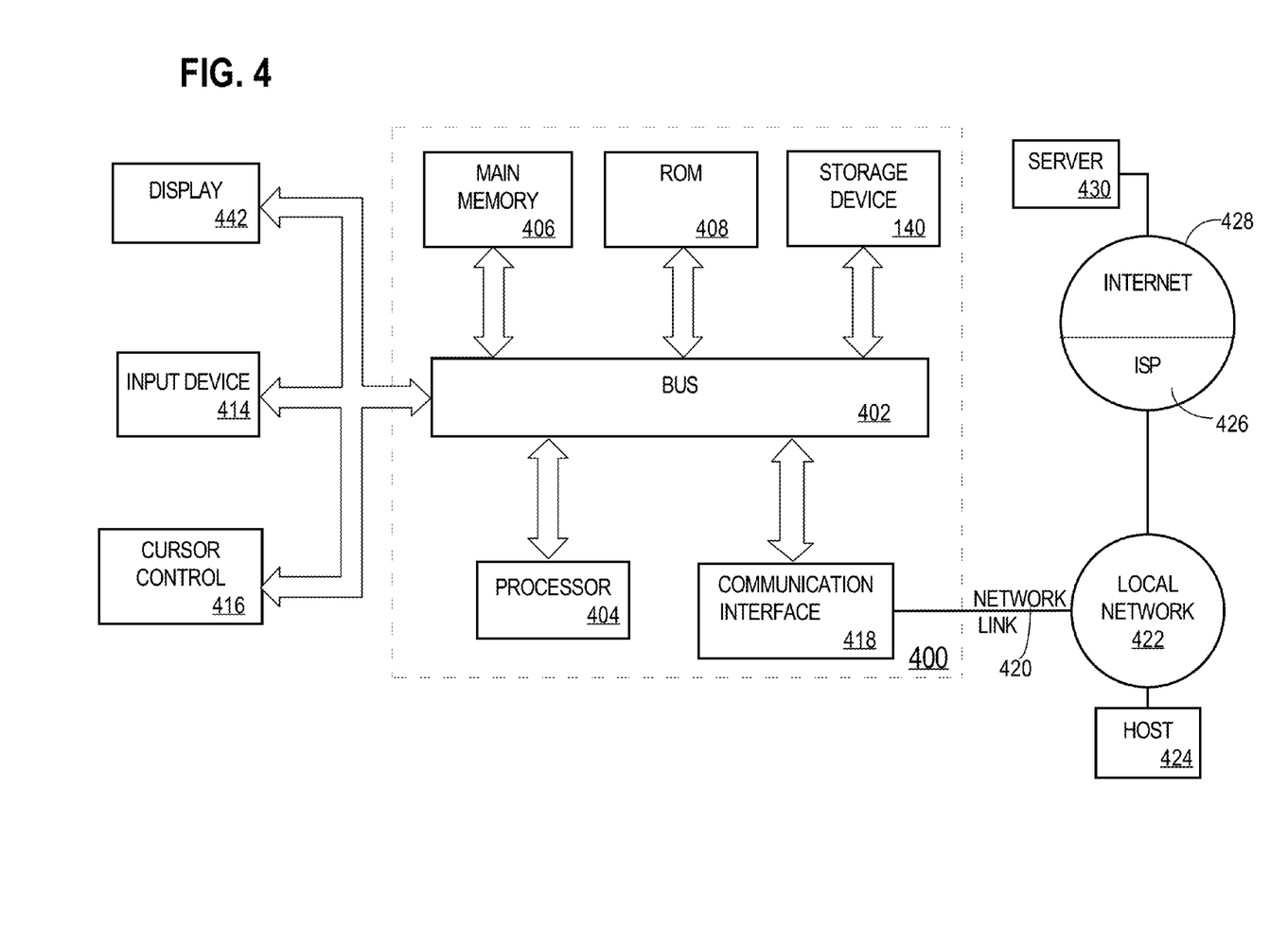
FIG. 4 illustrates a computer system that may be used to implement aspects of an embodiment.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

4. Extensions & Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
   receiving, at a mobile computing device, a request comprising a protocol identifier, a label value, and a data value, wherein the protocol identifier is associated with a protocol implemented in a first mobile app;
   using a protocol handler in the mobile computing device associated with the protocol, initiating processing of the request;
   using a native code element in the mobile computing device: intercepting the request from the protocol handler when the label value matches a particular expression, and in response to the intercepting, providing a unique identifier associated with the mobile computing device to other than the first mobile app, the protocol handler or the native code element;
   wherein the method is performed by one or more computing devices.

2. The method of claim 1 wherein the providing comprises providing the unique identifier to a second app in the mobile computing device.

3. The method of claim 1 wherein the providing comprises providing the unique identifier to a server computer using a callback.

4. The method of claim 3 further comprising receiving the request in response to selecting a link in a web page that is served from the server computer.

5. The method of claim 1 further comprising receiving a plurality of other requests each comprising a different protocol identifier, the label value and the data value; determining whether the protocol identifier matches any protocol handler registered in the mobile computing device; performing the processing, intercepting, obtaining, and providing in response to determining a first match of the protocol identifier to the protocol handler from among all the protocol identifiers.

6. The method of claim 3 further comprising:
   the server computer sending a plurality of requests to the mobile computing device, wherein each request in the plurality of requests comprises a different protocol identifier, the label value and the data value;
   determining whether the different protocol identifier in each request matches any protocol handler registered in the mobile computing device;
   performing the processing, intercepting, obtaining, and providing in response to determining a first match of any of the different protocol identifiers to the protocol handler.

7. The method of claim 3 wherein the server computer is associated with an advertising network.

8. The method of claim 1 further comprising causing the first app, linked with the native code element as part of a software development kit (SDK), to be installed on the mobile computing device.

9. The method of claim 4 wherein the data value comprises a click key indicating a function in the web page that was selected.

10. The method of claim 1 wherein the particular expression is a regular expression that matches functions of a service provider associated at least in part with registering to receive advertisements.

11. The method of claim 1, wherein the providing comprises providing the unique identifier to a second app in the mobile computing device; further comprising causing the second app to perform a re-engagement operation.

12. One or more non-transitory storage media storing instructions which, when executed by one or more computing devices, cause performing:
   receiving, at a mobile computing device, a request comprising a protocol identifier, a label value, and a data value, wherein the protocol identifier is associated with a protocol implemented in a first mobile app;
   using a protocol handler in the mobile computing device associated with the protocol, initiating processing of the request;
   using a native code element in the mobile computing device: intercepting the request from the protocol handler when the label value matches a particular expression, and in response to the intercepting, providing a unique identifier associated with the mobile computing device to other than the first mobile app, the protocol handler or the native code element.

13. The storage media of claim 12 wherein the providing comprises providing the unique identifier to a second app in the mobile computing device.

14. The storage media of claim 12 wherein the providing comprises providing the unique identifier to a server computer using a callback.

15. The storage media of claim 14 further comprising instructions which when executed cause receiving the request in response to selecting a link in a web page that is served from the server computer.

16. The storage media of claim 12 further comprising instructions which when executed cause:
   receiving a plurality of other requests each comprising a different protocol identifier, the label value and the data value;

determining whether the protocol identifier matches any protocol handler registered in the mobile computing device;

performing the processing, intercepting, obtaining, and providing in response to determining a first match of the protocol identifier to the protocol handler from among all the protocol identifiers.

17. The storage media of claim 14 further comprising instructions which when executed cause:

the server computer sending a plurality of requests to the mobile computing device, wherein each request in the plurality of requests comprises a different protocol identifier, the label value and the data value;

determining whether the different protocol identifier in each request matches any protocol handler registered in the mobile computing device;

performing the processing, intercepting, obtaining, and providing in response to determining a first match of any of the different protocol identifiers to the protocol handler.

18. The storage media of claim 14 wherein the server computer is associated with an advertising network.

19. The storage media of claim 12 further comprising instructions which when executed cause causing the first app, linked with the native code element as part of a software development kit (SDK), to be installed on the mobile computing device.

20. The storage media of claim 15 wherein the data value comprises a click key indicating a function in the web page that was selected.

21. The storage media of claim 12 wherein the particular expression is a regular expression that matches functions of a service provider associated at least in part with registering to receive advertisements.

22. The storage media of claim 12 wherein the providing comprises providing the unique identifier to a second app in the mobile computing device; further comprising causing the second app to perform a re-engagement operation.

\* \* \* \* \*